US012679168B2

(12) United States Patent
Graetzl et al.

(10) Patent No.: US 12,679,168 B2
(45) Date of Patent: Jul. 14, 2026

(54) HEAT EXCHANGER DEVICE FOR A MOTOR VEHICLE, METHOD FOR OPERATING A HEAT EXCHANGER DEVICE AND METHOD FOR PRODUCING A HEAT EXCHANGER DEVICE

(71) Applicant: Bayerische Motoren Werke Aktiengesellschaft, Munich (DE)

(72) Inventors: Thomas Graetzl, Munich (DE); Michael Wokrinek, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 520 days.

(21) Appl. No.: 17/780,055

(22) PCT Filed: Oct. 26, 2020

(86) PCT No.: PCT/EP2020/080035
§ 371 (c)(1),
(2) Date: May 26, 2022

(87) PCT Pub. No.: WO2021/104774
PCT Pub. Date: Jun. 3, 2021

(65) Prior Publication Data
US 2022/0410656 A1     Dec. 29, 2022

(30) Foreign Application Priority Data
Nov. 26, 2019    (DE) ..................... 10 2019 132 013.5

(51) Int. Cl.
*B60H 1/00*        (2006.01)
*B60H 1/34*        (2006.01)
(Continued)

(52) U.S. Cl.
CPC ..... *B60H 1/00328* (2013.01); *B60H 1/00295* (2019.05); *B60H 1/3407* (2013.01);
(Continued)

(58) Field of Classification Search
CPC ............ B60H 1/00328; B60H 1/00295; B60H 1/3407; B60H 2001/003; F28D 7/16;
(Continued)

(56) References Cited

U.S. PATENT DOCUMENTS

| | | | | |
|---|---|---|---|---|
| 1,815,570 A | * | 7/1931 | Jones ........................ | F28D 7/04 |
| | | | | 165/185 |
| 2,401,797 A | * | 6/1946 | Rasmussen ........... | F28F 13/003 |
| | | | | 210/185 |

(Continued)

FOREIGN PATENT DOCUMENTS

| | | |
|---|---|---|
| CN | 1903554 A | 1/2007 |
| CN | 101688763 A | 3/2010 |

(Continued)

OTHER PUBLICATIONS

International Search Report (PCT/ISA/210) issued in PCT Application No. PCT/EP2020/080035 dated Feb. 1, 2021 with English translation (four (4) pages).

(Continued)

*Primary Examiner* — Ljiljana V. Ciric
(74) *Attorney, Agent, or Firm* — Crowell & Moring LLP

(57)                ABSTRACT

A heat exchanger device for a motor vehicle includes a main body, through which a temperature-control medium can flow, and a media-conveying device which passes through the main body and by which a medium to be temperature-controlled can be conveyed through the main body. As a result, the temperature of the medium to be temperature-controlled can be controlled by heat exchange with the temperature-control medium. The main body is produced in an integral injection molding process, as a result of which the main body is closed on the periphery and open-pored in the interior.

15 Claims, 2 Drawing Sheets

Vehicle Interior
10

Vehicle
Component
11

(51) Int. Cl.

| | | |
|---|---|---|
| *F28D 7/16* | (2006.01) | |
| *F28D 21/00* | (2006.01) | |
| *F28F 7/02* | (2006.01) | |
| *F28F 13/00* | (2006.01) | |

(52) U.S. Cl.

CPC ............... *F28D 7/16* (2013.01); *F28F 7/02* (2013.01); *F28F 13/003* (2013.01); *B60H 2001/003* (2013.01); *F28D 2021/0078* (2013.01); *F28D 2021/0096* (2013.01)

(58) Field of Classification Search

CPC ...... F28D 2021/0078; F28D 2021/0096; F28F 7/02; F28F 13/003

See application file for complete search history.

(56) References Cited

U.S. PATENT DOCUMENTS

| | | | | |
|---|---|---|---|---|
| 2,707,096 A * | 4/1955 | Koopmans | F28D 7/0008 | 165/169 |
| 2,974,404 A * | 3/1961 | Humenik, Jr. | F28F 21/006 | 228/183 |
| 3,001,767 A * | 9/1961 | Straubing | F28D 7/106 | 29/455.1 |
| 3,100,386 A * | 8/1963 | Chausson | F25D 7/00 | 62/316 |
| 3,289,750 A * | 12/1966 | Valyi | F25B 39/04 | 165/169 |
| 3,289,756 A * | 12/1966 | Jaeger | F28F 13/003 | 29/890.036 |
| 3,306,353 A * | 2/1967 | Burne | F28F 1/02 | 165/172 |
| 3,331,435 A * | 7/1967 | Valyi | F28F 13/003 | 62/515 |
| 3,333,318 A * | 8/1967 | Jaeger | F28F 13/003 | 29/890.036 |
| 3,433,299 A * | 3/1969 | Fleming | F28F 1/42 | 165/135 |
| 3,439,739 A * | 4/1969 | Jaeger | F28D 7/106 | 165/DIG. 400 |
| 3,636,607 A * | 1/1972 | DeMarco | B21K 25/00 | 29/523 |
| 3,672,839 A * | 6/1972 | Moore | B01J 7/00 | 422/240 |
| 3,750,399 A * | 8/1973 | Moore | F22B 29/00 | 122/238 |
| 3,776,303 A * | 12/1973 | Anderson | F28D 7/12 | 165/DIG. 56 |
| 3,794,110 A * | 2/1974 | Severijns | F28F 13/003 | 165/DIG. 395 |
| 3,825,063 A * | 7/1974 | Cowans | F28F 21/06 | 165/146 |
| 3,828,736 A * | 8/1974 | Koch | F23R 3/40 | 123/3 |
| 3,899,031 A * | 8/1975 | Laessig | F22B 27/08 | 431/328 |
| 4,096,616 A * | 6/1978 | Coffinberry | B21D 53/06 | 29/890.036 |
| 4,108,241 A * | 8/1978 | Fortini | F02K 9/64 | 165/169 |
| 4,199,937 A * | 4/1980 | Fortini | F02K 9/64 | 239/127.1 |
| 4,245,469 A * | 1/1981 | Fortini | F28D 1/02 | 239/127.1 |
| 4,373,001 A * | 2/1983 | Smith | B32B 5/06 | 442/241 |
| 4,419,650 A * | 12/1983 | John | H01H 61/04 | 335/49 |
| 4,572,430 A * | 2/1986 | Takagi | B60H 1/00285 | 219/202 |
| 4,703,793 A * | 11/1987 | Townsend | F28G 11/00 | 165/95 |
| 4,715,431 A * | 12/1987 | Schwarz | F25J 5/005 | 165/913 |
| 4,715,433 A * | 12/1987 | Schwarz | F28D 9/0068 | 165/913 |
| 4,746,479 A * | 5/1988 | Hanaki | F28F 7/02 | 264/150 |
| 4,795,618 A * | 1/1989 | Laumen | B01J 8/067 | 422/222 |
| 4,817,672 A * | 4/1989 | Broodman | C10G 9/203 | 122/DIG. 13 |
| 4,903,761 A * | 2/1990 | Cima | F28D 15/043 | 165/41 |
| 5,029,638 A * | 7/1991 | Valenzuela | F28F 13/003 | 257/E23.091 |
| 5,101,894 A * | 4/1992 | Hendricks | F28F 3/086 | 165/DIG. 360 |
| 5,123,480 A * | 6/1992 | Dixit | F28D 13/00 | 432/83 |
| 5,233,755 A * | 8/1993 | Vandendriessche | F02K 9/64 | 60/222 |
| 5,266,099 A * | 11/1993 | Kelley | B22F 3/1125 | 75/337 |
| 5,298,337 A * | 3/1994 | Hendricks | B21C 33/002 | 428/569 |
| 5,453,641 A * | 9/1995 | Mundinger | F28D 15/046 | 361/689 |
| 5,620,366 A | 4/1997 | Muenzel et al. | | |
| 5,775,402 A * | 7/1998 | Sachs | B22F 5/007 | 164/4.1 |
| 6,112,804 A * | 9/2000 | Sachs | B33Y 10/00 | 249/80 |
| 6,131,650 A * | 10/2000 | North | F28F 13/003 | 257/E23.098 |
| 6,415,860 B1 | 7/2002 | Kelly et al. | | |
| 6,460,520 B1 * | 10/2002 | Challis | F28D 7/16 | 60/617 |
| 6,513,576 B1 * | 2/2003 | Le Guen | F28F 9/028 | 165/44 |
| 6,534,028 B2 * | 3/2003 | von Hippel | B01J 12/007 | 423/376 |
| 6,547,301 B1 * | 4/2003 | Keller | B60H 1/00564 | 165/42 |
| 6,736,442 B2 * | 5/2004 | Gebreselassie | B60R 13/083 | 296/97.23 |
| 6,749,656 B2 * | 6/2004 | Paumier | B60H 1/3407 | 264/DIG. 48 |
| 6,875,247 B2 * | 4/2005 | TeGrotenhuis | B01D 19/0031 | 261/153 |
| 7,083,663 B2 * | 8/2006 | Shih | B01D 46/84 | 422/4 |
| 7,243,707 B2 * | 7/2007 | Brost et al. | 165/103 | |
| 7,264,724 B2 * | 9/2007 | Vigna | B29C 66/30341 | 210/488 |
| 8,047,451 B2 * | 11/2011 | McNaughton | F28D 9/0031 | 239/128 |
| 9,103,602 B2 * | 8/2015 | Kroliczek | F28D 15/046 | |
| 10,094,284 B2 * | 10/2018 | Cordova | F28F 7/02 | |
| 10,837,716 B2 * | 11/2020 | Seidel | F28F 21/04 | |
| 11,034,623 B2 * | 6/2021 | Inoue | C08K 3/38 | |
| 11,175,101 B2 * | 11/2021 | Lambrech | H01M 8/04007 | |
| 11,541,344 B2 * | 1/2023 | Bischoff | E03B 3/00 | |
| 11,582,884 B2 * | 2/2023 | Vanderwees | H05K 7/20309 | |
| 11,698,230 B2 * | 7/2023 | Lambrech | B23P 15/26 | 165/104.26 |
| 2002/0096915 A1 * | 7/2002 | Haupt | B60N 2/5635 | 297/180.13 |
| 2005/0136100 A1 * | 6/2005 | Foss | A41B 17/00 | 424/443 |
| 2005/0211427 A1 | 9/2005 | Kenny et al. | | |
| 2007/0035162 A1 * | 2/2007 | Bier | B60N 2/5657 | 165/138 |
| 2007/0234565 A1 * | 10/2007 | Prociw | B22F 7/004 | 29/890.039 |
| 2009/0000577 A1 * | 1/2009 | Miyagawa | F01N 5/02 | 123/41.2 |
| 2010/0089548 A1 | 4/2010 | Braic et al. | | |

(56)          References Cited

U.S. PATENT DOCUMENTS

| | | | | |
|---|---|---|---|---|
| 2010/0139885 A1* | 6/2010 | Hoffman | F02G 1/057 | |
| | | | | 165/185 |
| 2010/0181053 A1 | 7/2010 | Hecht et al. | | |
| 2014/0130764 A1* | 5/2014 | Saumweber | F02M 35/10 | |
| | | | | 123/184.21 |
| 2014/0186652 A1* | 7/2014 | Poggi | B22C 9/04 | |
| | | | | 164/79 |
| 2015/0060028 A1* | 3/2015 | Irmler | F28D 21/0003 | |
| | | | | 165/157 |
| 2015/0068716 A1 | 3/2015 | Geskes | | |
| 2016/0131443 A1 | 5/2016 | Oliva et al. | | |
| 2016/0231072 A1* | 8/2016 | Pohlman | F28F 21/083 | |
| 2017/0167751 A1 | 6/2017 | Frechette et al. | | |
| 2020/0108689 A1* | 4/2020 | Karlsson | B60H 1/00278 | |
| 2020/0219476 A1 | 7/2020 | Bailer et al. | | |
| 2021/0222966 A1* | 7/2021 | Meczkowski | F28D 7/106 | |
| 2022/0034597 A1* | 2/2022 | Lambrech | H01M 8/04067 | |
| 2022/0410656 A1* | 12/2022 | Graetzl | F28F 13/003 | |
| 2024/0149634 A1* | 5/2024 | Preisler | B60H 1/00295 | |

FOREIGN PATENT DOCUMENTS

| | | | | |
|---|---|---|---|---|
| CN | 101726202 A | 6/2010 | | |
| CN | 104285120 A | 1/2015 | | |
| CN | 105308406 A | 2/2016 | | |
| CN | 109073272 A | 12/2018 | | |
| DE | 195 08 983 C1 | 2/1996 | | |
| DE | 19528168 A1 * | 2/1997 | | F28D 17/02 |
| DE | 19740502 A1 * | 3/1999 | | B22F 7/004 |
| DE | 10236523 A1 * | 2/2004 | | B22C 9/065 |
| DE | 10 2005 030 517 A1 | 2/2006 | | |
| DE | 10 2010 047 907 A1 | 4/2012 | | |
| DE | 10 2011 121 068 A1 | 1/2013 | | |
| DE | 102011078584 A1 * | 1/2013 | | F28F 13/003 |
| DE | 102012109966 A1 * | 5/2014 | | B29C 44/14 |
| DE | 102014224646 A1 * | 6/2016 | | |
| DE | 10 2017 206 304 A1 | 10/2018 | | |
| DE | 10 2017 216 254 A1 | 3/2019 | | |
| DE | 20 2018 101 360 U1 | 6/2019 | | |
| DE | 102019111290 B3 * | 10/2020 | | |
| DE | 102020115025 A1 * | 12/2021 | | |
| EP | 1454790 A1 * | 9/2004 | | B60H 1/00285 |
| EP | 2042291 B1 * | 4/2014 | | B29C 33/56 |
| FR | 2854229 A1 * | 10/2004 | | F24H 8/00 |
| KR | 10 0 964 137 B1 | 6/2010 | | |
| WO | WO-03080233 A1 * | 10/2003 | | B01J 19/0093 |
| WO | WO-2004078517 A2 * | 9/2004 | | B60H 1/00285 |
| WO | WO-2013004528 A1 * | 1/2013 | | F28F 13/003 |
| WO | WO-2020207679 A1 * | 10/2020 | | H01M 50/15 |
| WO | WO-2022264050 A1 * | 12/2022 | | B60H 1/00278 |

OTHER PUBLICATIONS

German-language Written Opinion (PCT/ISA/237) issued in PCT Application No. PCT/EP2020/080035 dated Feb. 1, 2021 (six (6) pages).

German-language Office Action issued in German Application No. 102019132013.5 dated Nov. 19, 2021 (five (5) pages).

Partial English translation of Chinese-language Office Action issued in Chinese Application No. 202080078360.7 dated Feb. 28, 2025 (8 pages).

Partial English translation of Chinese-language Office Action issued in Chinese Application No. 202080078360.7 dated Sep. 24, 2025 (10 pages).

* cited by examiner

Vehicle Interior
10

Vehicle
Component
11

HEAT EXCHANGER DEVICE FOR A MOTOR VEHICLE, METHOD FOR OPERATING A HEAT EXCHANGER DEVICE AND METHOD FOR PRODUCING A HEAT EXCHANGER DEVICE

BACKGROUND AND SUMMARY

The invention relates to a heat exchanger device for a motor vehicle, a method for operating a heat exchanger device and a method for providing a heat exchanger device for a motor vehicle.

DE 10 2011 121 068 A1 has already disclosed an air conditioning system for a motor vehicle which comprises a hot water circuit. The hot water circuit comprises an electric heating module acting on the water side, a circulation pump and a heat exchanger acting on the air side. Arranged downstream of the heat exchanger on the air side is an air distribution chamber, which has a footwell ventilation outlet and a headspace ventilation outlet. The heat exchanger is provided for heating the air stream supplied to the vehicle cabin.

Furthermore, DE 195 08 983 C1 discloses a device for the diffuse ventilation of a vehicle interior in the area of a dashboard. The device comprises an upper part that is visible to vehicle occupants and has a multiplicity of air outlet holes, and a lower part that is covered by the upper part and, together with the upper part, delimits an air distribution chamber connected to an air supply device. The air supply device allows air to be fed into the air distribution chamber, which air in turn can flow out diffusely into the vehicle interior via the air outlet holes.

It is an object of the present invention to devise a heat exchanger device for an automobile, a method for operating a heat exchanger device and a method for providing a heat exchanger device for a motor vehicle which permit particularly advantageous temperature control of a medium which is to be temperature-controlled.

According to the invention, this object is achieved by a heat exchanger device for a motor vehicle, by a method for operating a heat exchanger device and by a method for providing a heat exchanger device for a motor vehicle, in accordance with the independent claims.

A first aspect of the invention relates to a heat exchanger device for a motor vehicle, in particular an automobile, having a main body through which a temperature control medium can flow. Moreover, the heat exchanger device has a media-conveying device passing through the main body, by means of which a medium which is to be temperature-controlled can be conveyed through the main body, as a result of which the medium which is to be temperature-controlled can have its temperature controlled by heat exchange with the temperature control medium. By means of the media-conveying device, the medium which is to be temperature-controlled can be conveyed to the main body and conveyed through the main body via at least one channel. This at least one channel is fluidically separated from the main body and passes completely through the main body from a first side of the main body as far as a side of the main body that is opposite the first side. Here, the respective channel can be designed to be open toward the first side and/or toward the second side of the main body. As the medium is conveyed through the main body via the channel, heat exchange takes place between the medium which is to be temperature-controlled and the temperature control medium, because of which control of the temperature of the medium is achieved.

For particularly advantageous temperature control of the medium which is to be temperature-controlled, the invention provides for the main body to be produced in an integral injection molding process, as a result of which the main body is closed peripherally and has open pores in the interior. Because of its production in the integral injection molding process, this main body thus has a layer which is closed on the circumferential side and therefore tight but has open pores in the interior. The temperature control medium can be carried within this open-pored layer, by means of which, by heat absorption or heat dissipation, the medium flowing through the main body via the at least one channel can have its temperature controlled. The integral injection molding process constitutes a method combination of foaming and injection molding. The integral injection molding process is based on the principle of chemical foaming. Here, a propellant is mixed with a granulate and the granulate is then injection molded. While a melt of the granulate is being injected into a mold, a wall thickness over an entire component, the main body in the present case, is constant. Following the injection, an outer skin of the main body cools down, an injection molding machine encompassing the mold releases a closing force and opens by a so-called foaming stroke. In a still plasticized plastic core, the propellant foams the melt. The main body thus has the closed outer skin which encloses an open-pored hollow volume in the main body. The main body produced in the integral injection molding process is firstly particularly stable and secondly can be produced particularly simply. The heat exchanger device can thus be provided particularly simply and cost-effectively via the main body.

The heat exchanger device can be integrated into an instrument panel. Here, the main body can represent a main support of the instrument panel, in which there is integrated at least one instrument, which is set up to display a vehicle state of the motor vehicle. Alternatively, the main body can constitute a main support of a central console or a door lining or a roof lining. When the main body of the heat exchanger device is used as a main support of the instrument panel, provision is made in particular for the instrument to end flush with the main body on the upper side. In this way, projection of the instrument above the main element can be avoided, as a result of which a risk of damage to the instrument can be kept particularly low. The at least one instrument is thus, for example, integrated into the main body, as result of which the instrument can have its temperature controlled by means of the main body, in particular can be cooled. The instrument panel extends in particular in the cockpit of the motor vehicle, in particular designed as an automobile, along the vehicle transverse direction underneath the windshield, which means it overlaps the windshield in the vehicle vertical direction.

In this connection, it has proven to be particularly advantageous if, by means of the media-conveying device, air as a medium which is to be temperature-controlled can be conveyed through the main body and into an interior of the motor vehicle. The main body is then set up to control the temperature of the air while the air flows through the main body via the at least one channel. Here, the air can be cooled or heated as required by means of the main body. In the case of controlling the temperature of air as a medium which is to be temperature-controlled, the heat exchanger device can advantageously be part of an air-conditioning device of the motor vehicle.

In a further refinement of the invention, it has been shown to be to be particularly advantageous if the interior of the motor vehicle can be ventilated indirectly via the media-conveying device. This means that the media-conveying device is set up to cause the air to flow into the interior of the motor vehicle in an omnidirectional manner. The media-conveying device is thus set up to cause the air to flow out diffusely into the interior of the motor vehicle, as a result of which the indirect ventilation of the interior of the motor vehicle can be achieved. Here, it is in particular advantageous if the media-conveying device comprises a multiplicity of channels which extend through the main body, so that, via the multiplicity of channels, the air can be conveyed through the main body and into the interior of the motor vehicle. The multiplicity of channels here is in particular distributed uniformly over the entire outer surface of the main body facing the interior of the motor vehicle, so that uniform ventilation of the interior of the motor vehicle can be achieved over the entire outer surface of the main body. This means that particularly uniform ventilation of the interior of the motor vehicle is possible.

It has further been shown to be advantageous if the heat exchanger device comprises a connection device, via which the temperature control medium can be caused to flow into the main body and/or via which the temperature control medium can be removed from the main body. The connection device makes it possible, for example, for the temperature control medium to be conveyed through the main body, conveyed out of the main body, have its temperature re-controlled outside the main body and then be fed back into the main body to close the circular process. In this way, particularly efficient guidance of the temperature control medium can be achieved. In this way, particularly low deterioration of temperature control medium can be implemented. The temperature control medium is in particular a temperature control fluid, in particular water.

The invention further relates to a method for operating a heat exchanger device as has already been described in connection with the heat exchanger device according to the invention. In the method, a temperature control medium is conveyed into the main body, which is peripherally closed, has open pores in the interior and is produced in the integral injection molding process. Furthermore, the method provides for a medium which is to be temperature-controlled to be conveyed through the main body via at least one channel by means of the media-conveying device. In other words, the temperature control medium is conveyed in the main body, wherein circular guidance of the temperature control medium with re-controlling the temperature of the temperature control medium outside the main body has proven to be particularly advantageous. Via the at least one channel, in particular via a multiplicity of channels which pass through the main body, the medium which is to be temperature-controlled is conveyed past the main body, as a result of which heat exchange takes place between the medium which is to be temperature-controlled and the main body. Via the heat exchange between the main body and the medium flowing through the at least one channel, the temperature of the medium can be controlled. Here, heat is absorbed by the temperature control medium from the medium which is to be temperature-controlled in order to cool the medium, or heat is dissipated to the medium in order to heat the medium. The medium flows into the interior of the motor vehicle, for example, from the channel that passes through the at least one main body. The method thus advantageously permits the temperature of the medium to be controlled by means of the particularly simply and cost-effectively produced main body.

In this connection, it has proven to be particularly advantageous if a temperature control fluid, in particular water with an antifreeze, is conveyed into the main body as the temperature control medium and/or air is conveyed by means of the media-conveying device as the medium which is to be temperature-controlled. Water is, firstly, a very beneficial temperature control fluid and, secondly, a particularly environmentally friendly temperature control fluid. Furthermore, water has particularly advantageous heat transfer properties and, as a result, is particularly well suited as a temperature control fluid. When air is used as a medium which is to be temperature-controlled, the heat exchanger device can advantageously be used in an air-conditioning device of the motor vehicle. By means of the media-conveying device, the air can be conveyed to the main body, to have its temperature controlled, the air can be conveyed through the main body via at least one channel passing through the main body and, after its temperature has been controlled, the air can be supplied to an interior of the motor vehicle. The heat exchanger device thus permits particularly simple and efficient temperature control of air to be supplied to the interior of the motor vehicle.

The invention further relates to a method for providing a heat exchanger device for a motor vehicle, in which a main body is produced in an integral injection molding process. Because of its production in the integral injection molding process, the main body is peripherally closed and has open pores in the interior. This structural configuration of the main body makes it possible for a temperature control medium, in particular a temperature control fluid, in particular water with antifreeze, to be caused to flow through the main body. The integral injection molding process permits particularly simple and rapid production of the main body, wherein the main body is produced by a melt being injection molded and then foamed in its interior. In the method, provision is additionally made for at least one channel of a media-conveying device, in particular a multiplicity of channels of the media-conveying device, to pass through the main body. This means that the at least one channel extends continuously from a first side of the main body as far as a second side of the main body that is opposite the first side, wherein the channel is configured to be open both toward the first side and also toward the second side. By means of the media-conveying device, a medium which is to be temperature-controlled, in particular air, can be conveyed to the main body, for controlling the temperature of the medium, the medium can be conveyed through the main body via the at least one channel and, after its temperature has been controlled, the medium can, for example, be supplied to an interior of the motor vehicle. The at least one channel of the media-conveying device can be introduced into the main body during the production of the integral injection molding process. Alternatively, the at least one channel can be introduced into the main body following the integral injection molding process. The at least one channel passing through the main body permits the medium to flow along the main body, as a result of which heat exchange takes place between the temperature control medium carried within the main body and the medium which is to be temperature-controlled and which is conveyed through the channel. This heat exchange permits the temperature of the medium to be controlled. Because of the above-described production of the main body in the integral injection molding process, the heat exchanger device can be provided particularly simply, quickly and cost-effectively.

Advantages and advantageous developments of the heat exchanger device according to the invention are to be viewed as advantages and advantageous developments of the method according to the invention for operating a heat exchanger device and the method according to the invention for providing a heat exchanger device, and vice versa.

Further features of the invention emerge from the claims, the figures and the figure description. The features and feature combinations mentioned in the description and the features and feature combinations mentioned below in the figure description and/or shown on their own in the figures can be used not only in the respectively specified combination but also in other combinations or on their own.

The invention will now be explained in more detail by using a preferred exemplary embodiment and with reference to the drawings.

BRIEF DESCRIPTION OF THE DRAWINGS

The same or functionally identical elements are provided with the same designations in the figures.

DETAILED DESCRIPTION OF THE DRAWINGS

Figure 1:
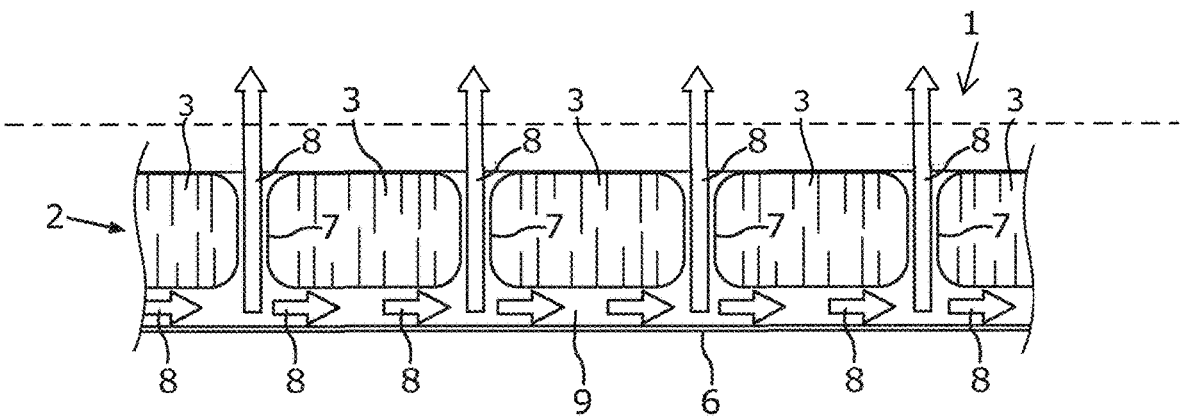
FIG. 1 is a schematic longitudinal cross section (taken along line 1-1 in FIG. 2) of a heat exchanger device for a motor vehicle having a main body produced in the integral injection molding process, through which a temperature control medium flows, and having a media-conveying device, by means of which air can be conveyed into an interior of the motor vehicle via channels passing through the main body.
Figure 2:
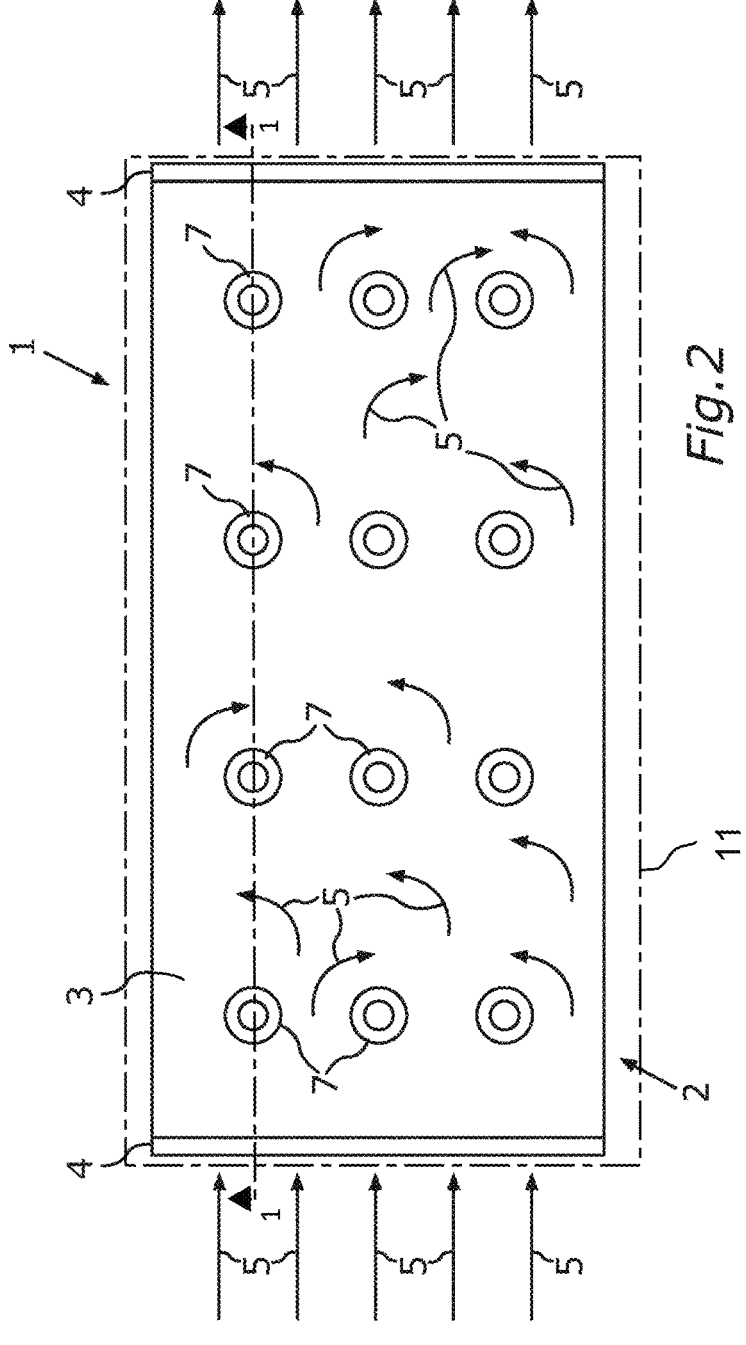
FIG. 2 is a widthwise cross section of the heat exchanger device, wherein the temperature control medium flows into the main body via a connection device and, within the main body, flows around the channels of the media-conveying device, as a result of which air carried in the channels is temperature-controlled.

A heat exchanger device 1 for a motor vehicle, in particular for an automobile, is illustrated in FIGS. 1 and 2 in a longitudinal section and in a cross section, respectively. The heat exchanger device 1 comprises a main body 3, by means of which air 8 which is to be temperature-controlled is to be supplied to an interior 10 of the automobile. The heat exchanger 1 is shown partly longitudinally sectioned in FIG. 1 and transversely sectioned in FIG. 2. The heat exchanger device 1 comprises a main body 3 and a connection device 4 (connection inlet or connection outlet). Via the connection device 4, a cooling medium, in particular a cooling fluid, in particular water with antifreeze, can be caused to flow into the main body 3 and removed from the main body 3. The main body 3 is peripherally or circumferentially closed and has open pores in the interior. This means that the main body 3 has a closed outer surface, which delimits an open-pored internal volume that is permeable to the temperature control medium. The temperature control medium 5 flowing into the main body 3 via the connection device 4 can flow through the open-pored volume of the main body 3, wherein turbulent flow in the temperature control medium can result from the open-pored nature.

In order to be able to produce the main body 3 particularly simply with the closed outer surface and the open-pored volume, the invention provides for the main body to be produced in an integral injection molding process.

The heat exchanger device 1 further comprises a media-conveying device 6, which is set up to convey a medium which is to be temperature-controlled, air 8 in the present case. In the following, the functioning of the heat exchanger device 1 will be described by using the example of air 8 as a medium which is to be temperature-controlled. In particular, air can be conveyed to the main body 3 of the heat exchanger 2 by means of the media-conveying device 6, can be conveyed through the main body 3 via a multiplicity of channels 7 and, after passing through the main body 3, can be conveyed via the channels 7 into an interior 10 of the motor vehicle. For this purpose, the channels 7 are designed to be open toward the interior 10 of the motor vehicle. The channels 7 pass through the main body 3, the channels 7 being designed to be circumferentially closed. Because of the circumferentially closed formation of the channels 7, mixing of the temperature control medium with the air 8 is prevented. The temperature of the air 8 can be controlled at least as it flows through the channels 7. In particular, as it flows through the respective channels 7, the air 8 can absorb heat from the main body 3 or dissipate heat to the main body 3. Following the control of the temperature of the air 8 as it flows through the channels 7, the air 8 is released into the interior 10 of the motor vehicle.

In the present case, the heat exchanger device 1 is part of an instrument panel of the motor vehicle, wherein the heat exchanger device 1 provides an outer surface of the instrument panel. Given a uniform arrangement of a multiplicity of channels 7 over an outer surface of the main body 3, the heat exchanger device 1 permits uniform indirect ventilation of the interior 10 of the motor vehicle.

During the operation of the heat exchanger device 1, the temperature control medium 5 flows through the open-pored structure of the main body 3. Via the respective channels 7, the air 8 which is to be temperature-controlled can flow from a first side of the main body to a second side of the main body 3 that is opposite the first side of the main body, as a result of which the air 8 flows through the main body 3. Because of interactions between the air 8 and the temperature control medium 5 in the open-pored main body 3, the temperature of the air flowing past is matched to a temperature of the temperature control medium 5. The main body 3 is thus used for heat exchange between the temperature control medium 5 and the air 8. In particular, water can be flushed through the open-pored main body 3 as temperature control medium 5. The air 8 is conveyed to the respective channels 7 via a feed channel 9 of the media-conveying device 6. Via nozzles, not illustrated in the figures, arranged on an outer side of the main body 3, the air 8 can be blown out of the channels 7 into the interior 10 of the motor vehicle. As an alternative or in addition to the nozzles, the air 8 from the channels 7 can flow into the interior 10 of the motor vehicle via a permeable top material, in particular made of cloth or perforated leather. As it flows through the channels 7, the air 8 at least substantially assumes the temperature of the main support 3.

The heat exchanger device 1 can be used at an extremely wide range of locations in the interior 10 of the motor vehicle. In particular, the heat exchanger device 1 can be integrated in the instrument panel of the motor vehicle. Here, the instrument panel and the main body 3 can be cooled directly by means of the temperature control medium 5. At the same time, the main body 3 makes it possible for the air 8 to be cooled by means of the temperature control medium 5. In this way, an evaporator and/or heat exchanger which, according to the current prior art, are installed in an air-conditioning system to control the temperature of the air, can be omitted or reduced. By means of the heat exchanger device 1, large surface diffusers with their own temperature control can be provided. Here, temperature control for the air 8 which is to be temperature-controlled can be adjusted via a temperature of the temperature control medium 5 and/or via a flow velocity of the air 8.

Additionally, the heat exchanger device 1 can be used in connection with a wide range of vehicle components 11 within the interior 10 of the motor vehicle. For example, as previously described, the heat exchanger device 1 can be used in connection with the following vehicle components 11: an instrument panel, a central console, a door lining, a roof lining, and/or underneath a windshield of the vehicle.

Overall, the invention shows how a main body 3 produced in the integral injection molding process can be used as a heat exchanger.

LIST OF DESIGNATIONS

1 Heat exchanger device
3 Main body
4 Connection device
8 Temperature control medium
6 Media-conveying device
7 Channel
8 Air
9 Feed channel
10 Vehicle Interior
11 Vehicle Component

The invention claimed is:

1. A heat exchanger device for use in a motor vehicle, comprising:
a main body forming an integral structure, defining an interior volume configured to receive a fluid temperature control medium, the main body comprising:
an inlet configured to convey a flow of the fluid temperature control medium into the interior volume,
an outlet configured to convey the flow of the fluid temperature control medium out of the interior volume, and
a plurality of air channels extending through the main body from air inlet openings formed on a first side of the main body to air outlet openings formed on a second side of the main body opposite the first side and facing the interior of the motor vehicle, wherein each air channel of the plurality of air channels is circumferentially enclosed along its length, and
an air feed channel in fluid communication with each of the plurality of air channels, the air feed channel configured to convey a flow of air through the air feed channel and the plurality of air channels,
wherein the flow of air through the plurality of air channels does not mix with any fluid temperature control medium within the interior volume of the main body by virtue of the circumferentially enclosed air channels, and
wherein heat is exchanged between the flow of air through the plurality of air channels and the fluid temperature control medium within the interior volume of the main body.

2. The heat exchanger device of claim 1, wherein the main body is an integral injection molded part.

3. The heat exchanger device of claim 1, wherein the interior volume is circumferentially enclosed.

4. The heat exchanger device of claim 1, wherein the main body is part of a central console of the vehicle.

5. The heat exchanger device of claim 1, wherein the main body is part of a door lining of the vehicle.

6. The heat exchanger device of claim 1, wherein the main body is part of a roof lining of the vehicle.

7. The heat exchanger device of claim 1, wherein the main body is positioned underneath a windshield of the vehicle.

8

8. The heat exchanger device of claim 1, wherein a permeable material covers the second side of the main body.

9. The heat exchanger device of claim 1, wherein the fluid temperature control medium is a liquid.

10. The heat exchanger device of claim 1, wherein the fluid temperature control medium comprises water and an antifreeze.

11. The heat exchanger device of claim 1, wherein the heat exchanger device is a liquid-to-air heat exchanger device.

12. The heat exchanger device of claim 1, wherein the main body is configured to produce a turbulent flow of the fluid temperature control medium between the inlet and the outlet.

13. The heat exchanger device of claim 1, wherein the plurality of air channels comprise corresponding nozzles positioned on the second side of the main body.

14. A heat exchanger device for use in a motor vehicle, comprising:
a main body defining an interior volume configured to receive a fluid temperature control medium, the main body comprising:
an inlet configured to convey a flow of the fluid temperature control medium into the interior volume,
an outlet configured to convey the flow of the fluid temperature control medium out of the interior volume, and
a plurality of air channels extending through the main body from air inlet openings formed on a first side of the main body to air outlet openings formed on a second side of the main body opposite the first side and facing the interior of the motor vehicle, wherein each air channel of the plurality of air channels is circumferentially enclosed along its length, and
an air feed channel in fluid communication with each of the plurality of air channels, the air feed channel configured to convey a flow of air through the air feed channel and the plurality of air channels,
wherein the flow of air through the plurality of air channels does not mix with any fluid temperature control medium within the interior volume of the main body by virtue of the circumferentially enclosed air channels,
wherein heat is exchanged between the flow of air through the plurality of air channels and the fluid temperature control medium within the interior volume of the main body, and
wherein individual air channels of the plurality of air channels are spaced equidistant relative to each other along planes passing through the axial center of the individual air channels.

15. A heat exchanger device for use in a motor vehicle, comprising:
a main body defining an interior volume configured to receive a fluid temperature control medium, the main body comprising:
an inlet configured to convey a flow of the fluid temperature control medium into the interior volume,
an outlet configured to convey the flow of the fluid temperature control medium out of the interior volume, and
a plurality of air channels extending through the main body from air inlet openings formed on a first side of the main body to air outlet openings formed on a second side of the main body opposite the first side and facing the interior of the motor vehicle, wherein each air channel of the plurality of air channels is circumferentially enclosed along its length, and an air feed channel in fluid communication with each of the plurality of air channels, the air feed channel configured to convey a flow of air through the air feed channel and the plurality of air channels, wherein the flow of air through the plurality of air channels does not mix with any fluid temperature control medium within the interior volume of the main body by virtue of the circumferentially enclosed air channels, wherein heat is exchanged between the flow of air through the plurality of air channels and the fluid temperature control medium within the interior volume of the main body, and wherein the main body is integrated into an instrument panel of the vehicle.

\* \* \* \* \*